United States Patent [19]
Lang et al.

[11] Patent Number: 5,925,272
[45] Date of Patent: Jul. 20, 1999

[54] VEHICLE REAR VIEW MIRROR ASSEMBLY WITH HEATING AND ANTENNA FEATURES

[75] Inventors: Heinrich Lang, Ergersheim; Wolfgang Seiboth, Bad Windsheim, both of Germany

[73] Assignee: MEKRA Lang GmbH & Co. KG, Furth, Germany

[21] Appl. No.: 08/832,925

[22] Filed: Apr. 4, 1997

[30] Foreign Application Priority Data

Apr. 6, 1996 [DE] Germany .................. 296 06 416 U

[51] Int. Cl.⁶ .................. H05B 1/00; H01Q 1/32
[52] U.S. Cl. .......................... 219/219; 343/713
[58] Field of Search .................. 219/219; 343/713, 343/704; 455/345; 362/83.1

[56] References Cited

U.S. PATENT DOCUMENTS

| | | |
|---|---|---|
| 2,836,818 | 5/1958 | Virgilis . |
| 3,790,748 | 2/1974 | Van Laethem et al. .......... 219/219 |
| 4,071,736 | 1/1978 | Kamerling .......... 219/219 |
| 4,281,899 | 8/1981 | Oskam .......... 350/289 |
| 4,352,006 | 9/1982 | Zega .......... 219/219 |
| 4,625,210 | 11/1986 | Sagl . |
| 5,005,020 | 4/1991 | Ogawa et al. . |
| 5,113,195 | 5/1992 | Sakurai .......... 343/704 |
| 5,151,824 | 9/1992 | O'Farrell .......... 359/604 |
| 5,371,659 | 12/1994 | Pastrick et al. .......... 362/83.1 |
| 5,416,491 | 5/1995 | Nishikawa .......... 343/713 |
| 5,461,391 | 10/1995 | Ohnishi et al. .......... 343/713 |
| 5,649,316 | 7/1997 | Prudhomme et al. .......... 455/345 |

FOREIGN PATENT DOCUMENTS

| | | |
|---|---|---|
| 0673801A1 | 9/1995 | European Pat. Off. . |
| 6933364 | 8/1969 | Germany . |
| 3824417A1 | 1/1990 | Germany . |
| 4019268C2 | 9/1991 | Germany . |
| 19523416 | 1/1996 | Germany . |
| 2157633 | 10/1985 | United Kingdom . |
| 9009041 | 8/1990 | WIPO . |
| 9100626 | 1/1991 | WIPO . |
| 9519598 | 7/1995 | WIPO . |
| 9532528 | 11/1995 | WIPO . |

OTHER PUBLICATIONS

Search Report, German Application No. 296 06 416.5, dated Aug. 2, 1996.

English language Abstract for Japanese Patent No. 3–187713, Published Feb. 12, 1993.

*Primary Examiner*—Teresa Walberg
*Assistant Examiner*—Daniel Robinson
*Attorney, Agent, or Firm*—Dority & Manning, P.A.

[57] ABSTRACT

A multi-layer heating and antenna element for mounting to a mirror plate of a vehicle rear view mirror assembly includes a heating foil layer secured to a surface of the mirror plate for heating the mirror plate, a conducting layer adjacent the heating foil layer for providing a heating current to the heating foil layer, an antenna layer, and at least one insulating layer between the conducting layer and the antenna layer for insulating the antenna layer from the conducting layer. A rear view mirror assembly mountable to a mirror housing includes a mirror carrier plate having a first and a second surface, a mirror plate secured to the mirror carrier plate, a heating foil disposed between the first surface of the mirror carrier plate and the mirror plate for heating the mirror plate, and an antenna secured to an disposed along the second surface of the mirror carrier plate. Related rear view mirror assemblies are also disclosed.

25 Claims, 2 Drawing Sheets

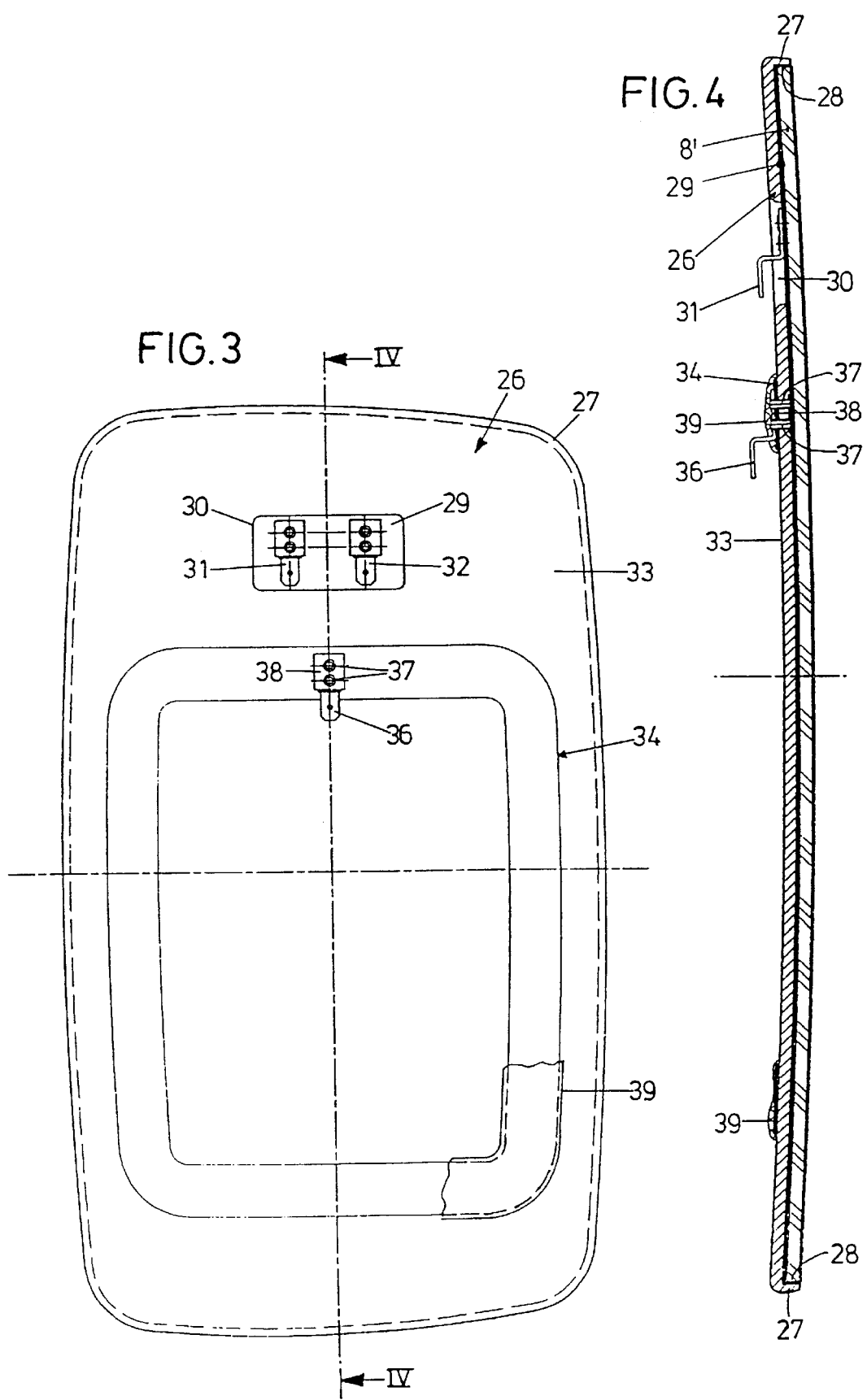

VEHICLE REAR VIEW MIRROR ASSEMBLY WITH HEATING AND ANTENNA FEATURES

BACKGROUND OF THE INVENTION

The invention concerns an external rear view mirror for motor vehicles, and more particularly concerns an external rear view mirror having a heating foil and an insulated antenna.

External rear view mirrors, especially in their use as external mirrors for trucks, are in common and wide use. The reflecting plates of the mirrors, which are installed in a housing, or advantageously swivel, are often designed to be heated in order to reduce the deposition of fog or ice and to this end, a heating foil is placed on the rear side. This heating foil can be affixed to the mirror back surface by adhesives or, upon the use of a so-called mirror carrying plate, can be set between the mirror plate and the holding plate for said mirror plate. In general, such heating foils exhibit at least one insulated foil carrier and a shaped conductor element placed thereon, which element is supplied with heating current in accord with the requirements of the respective mirror conditions.

Installing an antenna for any motor vehicle for optimum receipt of radio programs, CB radio, navigation signals etc., gives rise to varying points of view. Aside from the most simple mechanical design, a securely functioning antenna must be set far away from radio disturbance sources within the vehicle, but at the same time, be as close to the sending-receiving equipment as possible. Also, the protection of the antenna against such damage as might occur by driving through wash equipment or by vandalism is to be observed.

OBJECTS AND SUMMARY OF THE INVENTION

For the solving of the above problems, the invention proposes to create the antenna as a loop or configuration on the heating foil, but insulated from the heater supply current for the sending/receiving of radio, CB or navigation signals. In such a design, the antenna is installed inside the mirror housing and thus is protected from unauthorized access. In a functional, technical consideration, this type of installation with the mirror is advantageous, since here a favorable compromise is made between the greatest possible distance from disturbance sources and the closest possible approach to sending/receiving equipment. Further, it is of advantage that the antenna can be produced in common with the heating foil as a purchasable commodity. The eventual final mounting is then limited to making the antenna connections, without being involved with further installation costs, since the combination heating foil/antenna is installed in one operation.

It is possible to use different alternatives for the installation of the antenna on the heating foil. The antenna conductor can be stamped on, laminated, or printed into place. Upon stamping, the antenna is stamped from thin aluminum foil and the punched part imposed by pressure on an insulated surface of the heating foil. When lamination is chosen, a corresponding section of antenna conductor is combined with the heating foil surface by a long-life adhesive. If printed on, then correspondingly, a conductive inking would be used.

By means of the protective layer between the antenna and the heating conductors, the sending/receiving abilities of the antenna are improved, since the disturbances arising from the heating current cannot be imparted to the antenna because of this protective layer. In order to guarantee a true ground connection for the protective layer, in accord with an aspect of the invention the said layer is coupled with another protective, grounded sheath of a coaxial cable serving for connection of the antenna. Another aspect of the invention provides for an antenna extended from a basic type to an antenna installed on a flat carrier. Differing from the above, the heating foil does not serve as the carrier, rather, a carrying plate often used in modern mirrors is employed for the securement of the antenna. Such mirror carrier plates secure the mirror glass and exhibit the necessary designed elements for swiveling operation. Finally, a mirror carrier plate can be more simply and easily made by spraying plastic and be installed with less trouble than mounting the mirror itself Thus, the mirror carrier plate now possesses an additional function, namely that of an antenna carrier.

In an advantageous way, the antenna is installed on the rear side of the mirror carrier plate, remote from the mirror plate. In accord with an aspect of the invention, the mirror carrying plate can be simultaneously caused to serve as a holding means for a connection element (for instance, a connection clip) for the antenna, since the connection element in the mirror carrier plate is already riveted in position.

In order to protect the antenna from harmful external influences of mechanical as well as an electrical nature, the antenna is provided on its upper side with an insulation covering.

Additional objects and advantages of the invention will be set forth in part in the following description, or may be obvious from the description, or may be learned from practice of the invention.

Further features, details and advantages of the invention can be taken from the following description, in which embodiment examples of the object of the invention are more closely examined.

BRIEF DESCRIPTION OF THE DRAWINGS

The following show.

DESCRIPTION OF THE PREFERRED EMBODIMENTS

Figure 1:
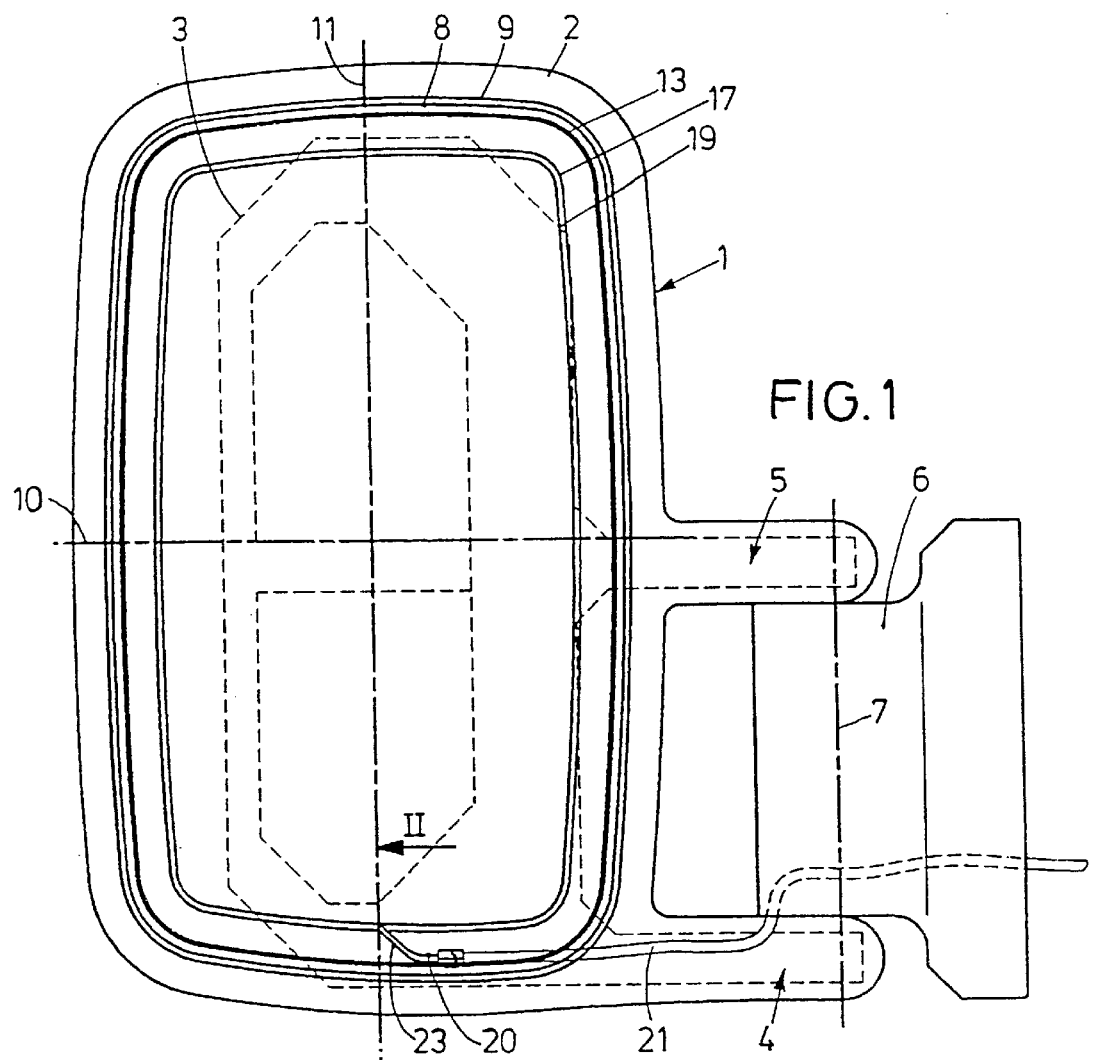
FIG. 1 a schematic view of an external mirror with a printed antenna in a first embodiment, FIG. 2 a partial, schematic section through the mirror plate along the section line II—II of FIG. 1, FIG. 3 a view from the rear of a mirror carrying plate with the shaped antenna conductor which has been installed thereon, and FIG. 4 a vertical section in accord with section line IV—IV of FIG. 3.

Reference will now be made in detail to the presently preferred embodiments of the invention, one or more examples of which are illustrated in the drawings. Each is provided by way of explanation of the invention, and not meant as a limitation of the invention. For example, features illustrated or described as part of one embodiment can be used on another embodiment to yield yet another embodiment. It is intended that the present invention include such modifications and variations.

The external mirror 1 shown in FIG. 1, shows a housing, designated as one unit as reference number 2, which principally acts as an aerodynamic fairing. Schematically presented in FIG. 1 by a dotted line, a carrier plate 3 is provided which is attached through support arms 4,5 which in turn are supported from the vehicle by pedestal 6. Pedestal 6 is found, for example, on the driver's door or on the A-column of a truck. The two support arms 4,5 are swingably hinged to the pedestal 6 around an axis 7.

The external mirror 1 exhibits further a mirror plate 8 which is secured in a housing opening 9, by means of a containing arrangement (not shown) which allows swivelling about the two depicted axes 10,11, which containing arrangement is anchored on the carrier plate 3. For this securement design there are various embodiments known and which may be employed, but in this case need not be further explained in detail.

On the rear side 12 of the mirror plate 8 a combination heating-antenna foil element 13 is installed, the outline contour of which is shown in heavy black line on FIG. 1. This laminar foil design is presented schematically in FIG. 2. An insulated foil carrier 14, which is attached to the mirror by adhesives and which determines the outer contour of the heating-antenna foil, is provided with a heating current conducting layer 15 which, in a way not shown, meanders in a path over the foil carrier 14. The arrangement and the installation of such heating conductors is known in the state of the art and are common, hence thus requiring no further explanation.

By the interpositioning of an insulating layer 16, a laminar, electrically conductive, protective layer 17 is added, the outline of which is also shown in FIG. 1, likewise with a continuous line. This protective layer can, for example, be comprised of a thin, aluminum foil backing.

A further insulation layer 18 is adherently affixed, upon which the ring shaped antenna conductor 19 is printed. The ringlike outline of the antenna 19 as it appears in FIG. 1, again with solid lines, is principally an example. The actual antenna configuration will be adjusted in accord with the respective sending/receiving conditions and characteristics.

Figure 2:
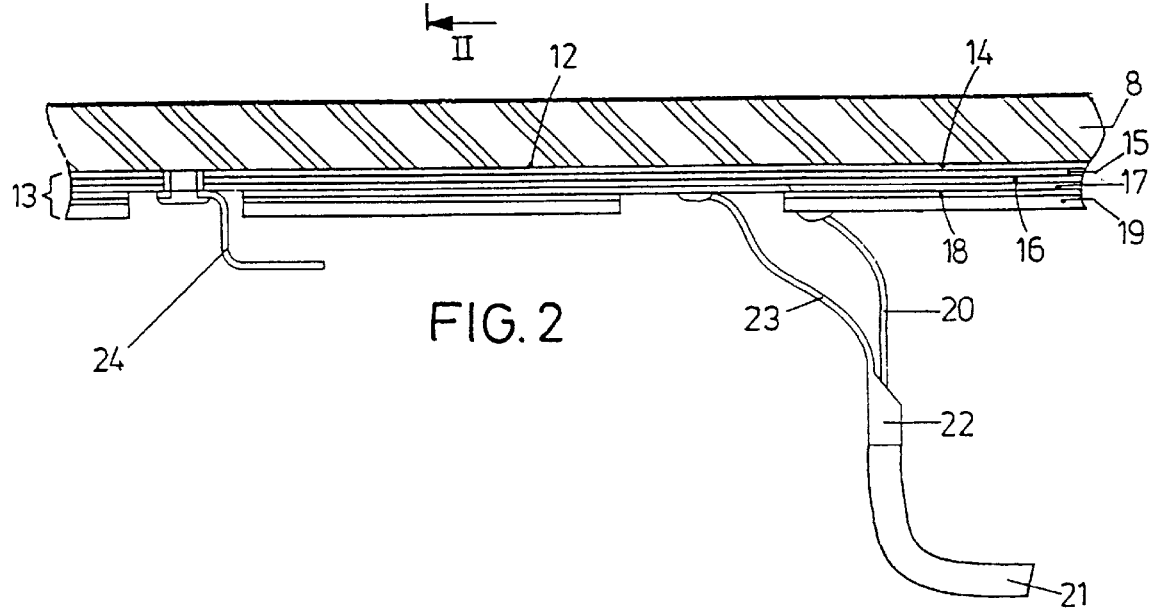

As is schematically implied in FIG. 2, the antenna 19 is connected with the central supply connection 20 of an antenna coaxial cable 21, which is run through the under carrier arm 4 and the pedestal 6 to the sending/receiving equipment of the vehicle. The electrically grounded sheath 22 of the coaxial cable 21 is short-circuited by means of a corresponding conductive connection 23 with the protective layer 17, whereby, the heating current present in the conducting layer 15 has no effect on the impulses carried by the antenna 19. In further detail, the conducting layer 15 is connected through a riveted on connection clip 24 with the heating connection cable (not shown). In FIG. 2, one pole of clip 24 is shown.

In FIG. 3 and 4, an embodiment of the subject of the invention is shown, as it would be installed in a mirror design having a separate mirror carrier plate 26. The latter, for instance, will be fastened on the holding plate of a Universal Ball Joint which extends from a carrier plate 3 of the mirror, by a means not further illustrated. The mirror carrier plate 26 holds the mirror plate 8', whereby by means of a peripherally surrounding rim piece 27 the edges 28 of the mirror are protected. The fastening of the mirror plate 8' in the mirror carrying plate 26 is done by means of a "double-stick" adhesive heating foil 29, which is inserted between these two components. In a penetration 30, of the mirror carrying plate 26, the two connection clips 31, 32, which are riveted on the heating foil 29 (not shown in detail) are connected to the heating conductors of the heating foil 29.

As especially made clear by FIG. 3, on the rear side 33 of the mirror carrying plate 26 a somewhat rectangular, ring-shaped continuous antenna conductor 34 is pressed, printed, laminated or glued.

On the upper cross-over of the antenna configuration 34 is found an additional connection clip 36, which is fastened by means of the rivets 37, is anchored onto the material of the mirror carrying plate 26. The foot 38 of the connection clip 36 lies below an insulation covering 39, which is only partially indicated in FIG. 3, yet this covers the entire length of the antenna configuration 34. In regard to the protective covering 39, this relates to an insulating, adhesive tape.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A vehicle rear view mirror assembly mountable to a mirror housing, the assembly comprising:
   a mirror plate mountable to the mirror housing; and
   a multi-layer heating and antenna element secured to a surface of the mirror plate and including a heating foil layer adjacent the surface for heating the mirror plate, a conducting layer adjacent the heating foil layer for providing a heating current to the heating foil layer, an antenna layer, and at least one insulating layer between the conducting layer and the antenna layer for insulating the antenna layer from the conducting layer.

2. The assembly of claim 1, wherein the multi-layer heating and antenna element further includes a conductive protective layer and two insulating layers, the multi-layer heating and antenna element being arranged in the following order: the heating foil layer, the conducting layer, a first of the two insulating layers, the conductive protective layer, a second of the two insulating layers, and the antenna layer.

3. The assembly of claim 2, wherein the conductive protective layer is electrically grounded via a conductive connector.

4. The assembly of claim 1, wherein the antenna layer is a stamped layer.

5. The assembly of claim 1, wherein the antenna layer is a laminated layer.

6. The assembly of claim 1, wherein the antenna layer is a printed layer.

7. A vehicle rear view mirror assembly comprising:
   a mirror housing;
   a mirror plate mountable to the mirror housing; and
   a multi-layer heating and antenna element secured to a surface of the mirror plate and including a heating foil layer adjacent the surface for heating the mirror plate, a conducting layer adjacent the heating foil layer for providing a heating current to the heating foil layer, an antenna layer, and at least one insulating layer between the conducting layer and the antenna layer for insulating the antenna layer from the conducting layer.

8. The assembly of claim 7, wherein the multi-layer heating and antenna element further includes a conductive protective layer and two insulating layers, the multi-layer heating and antenna element being arranged in the following order: the heating foil layer, the conducting layer, a first of the two insulating layers, the conductive protective layer, a second of the two insulating layers, and the antenna layer.

9. The assembly of claim 8, wherein the conductive protective layer is electrically grounded via a conductive connector.

10. The assembly of claim 7, wherein the antenna layer is a stamped layer.

11. The assembly of claim 7, wherein the antenna layer is a laminated layer.

12. The assembly of claim 7, wherein the antenna layer is a printed layer.

13. A multi-layer heating and antenna element for mounting to a mirror plate of a vehicle rear view mirror assembly, the element comprising:

a heating foil layer secured to a surface of the mirror plate for heating the mirror plate;

a conducting layer adjacent the heating foil layer for providing a heating current to the heating foil layer;

an antenna layer; and and at least one insulating layer between the conducting layer and the antenna layer for insulating the antenna layer from the conducting layer.

14. The element of claim 13, further including a conductive protective layer and two insulating layers, the multi-layer heating and antenna element being arranged in the following order: the heating foil layer, the conducting layer, a first of the two insulating layers, the conductive protective layer, a second of the two insulating layers, and the antenna layer.

15. The element of claim 13, wherein the antenna layer is a stamped layer.

16. The element of claim 13, wherein the antenna layer is a laminated layer.

17. The element of claim 13, wherein the antenna layer is a printed layer.

18. A rear view mirror assembly mountable to a mirror housing, the assembly comprising:

a mirror carrier plate having a first and a second surface;

a mirror plate secured to the mirror carrier plate;

a heating foil disposed between the first surface of the mirror carrier plate and the mirror plate for heating the mirror plate; and an antenna secured to and disposed along the second surface of the mirror carrier plate.

19. The assembly of claim 18, wherein the mirror carrier plate defines at least one opening through which at least one connection clip for providing electrical connection to the heating foil extends.

20. The assembly of claim 18, further including at least one connection clip for providing electrical connection to the antenna.

21. The assembly of claim 18, further including an insulating covering disposed atop the antenna.

22. A rear view mirror assembly comprising:

a mirror housing;

a mirror carrier plate secured to the mirror housing and having a first and second surface;

a mirror plate secured to the mirror carrier plate;

a heating foil disposed between the first surface of the mirror carrier plate and the mirror plate for heating the mirror plate; and an antenna secured to and disposed along the second surface of the mirror carrier plate.

23. The assembly of claim 22, wherein the mirror carrier plate defines at least one opening through which at least one connection clip for providing electrical connection to the heating foil extends.

24. The assembly of claim 22, further including at least one connection clip for providing electrical connection to the antenna.

25. The assembly of claim 22, further including an insulating covering disposed atop the antenna.

* * * * *